(12) United States Patent
Engfehr et al.

(10) Patent No.: US 10,082,109 B2
(45) Date of Patent: Sep. 25, 2018

(54) SYSTEM, METHOD, AND APPARATUS TO CONTROL ENGINE INTAKE MANIFOLD AIR TEMPERATURE

(71) Applicant: Caterpillar Inc., Peoria, IL (US)

(72) Inventors: Matthew J. Engfehr, Dunlap, IL (US); Nathan P. Atterberry, Washington, IL (US); David F. Schaller, Dunlap, IL (US)

(73) Assignee: Caterpillar Inc., Deerfield, IL (US)

( * ) Notice: Subject to any disclaimer, the term of this patent is extended or adjusted under 35 U.S.C. 154(b) by 34 days.

(21) Appl. No.: 15/255,999

(22) Filed: Sep. 2, 2016

(65) Prior Publication Data

US 2018/0066618 A1  Mar. 8, 2018

(51) Int. Cl.
| | |
|---|---|
| *F02M 35/10* | (2006.01) |
| *F02M 21/06* | (2006.01) |
| *F02D 35/02* | (2006.01) |
| *F02D 41/00* | (2006.01) |
| *F02M 35/104* | (2006.01) |
| *F01P 3/20* | (2006.01) |

(Continued)

(52) U.S. Cl.
CPC ............... *F02M 21/06* (2013.01); *F01P 3/20* (2013.01); *F02D 35/023* (2013.01); *F02D 35/027* (2013.01); *F02D 41/0002* (2013.01); *F02D 41/0025* (2013.01); *F02M 31/10* (2013.01); *F02M 31/105* (2013.01); *F02M 31/107* (2013.01); *F02M 31/18* (2013.01); *F02M 31/183* (2013.01); *F02M 35/104* (2013.01); *F02M 35/1038* (2013.01); *F02M 35/10157* (2013.01); *F02M 35/10268* (2013.01)

(58) Field of Classification Search
CPC ..................... F17C 2227/0393; F02M 21/06; F02M 31/00; F02M 31/005; F02M 31/02; F02M 31/10; F02M 31/105; F02M 31/107; F02M 31/16; F02M 31/18; F02M 31/183

See application file for complete search history.

(56) References Cited

U.S. PATENT DOCUMENTS

| | | | | |
|---|---|---|---|---|
| 5,081,977 A | * | 1/1992 | Swenson | ................. F02B 43/00 123/1 A |
| 5,375,582 A | * | 12/1994 | Wimer | ...................... F17C 9/04 123/525 |
| 6,125,637 A | * | 10/2000 | Bingham | ................ F02B 43/00 62/48.2 |

(Continued)

FOREIGN PATENT DOCUMENTS

| | | |
|---|---|---|
| CN | 105401989 | 3/2016 |
| EP | 2 868 890 A1 | 5/2015 |

(Continued)

*Primary Examiner* — Sizo Vilakazi
*Assistant Examiner* — Kevin R Steckbauer
(74) *Attorney, Agent, or Firm* — Oblon, McClelland, Maier & Neustadt (57) ABSTRACT

A system, method, and apparatus for controlling intake manifold air temperature (IMAT) of a dual fuel engine are provided. A determination regarding whether IMAT is to be modified is performed, followed by modifying the IMAT by changing flow of coolant in a cooling circuit in fluid communication with a separate circuit aftercooler (SCAC) of a SCAC circuit from a first flow path to a second flow path when it is determined that the IMAT is to be modified. A portion of the first flow path overlaps a portion of the second flow path.

11 Claims, 7 Drawing Sheets

(51) Int. Cl.
*F02M 31/10* (2006.01)
*F02M 31/18* (2006.01)

(56) References Cited

U.S. PATENT DOCUMENTS

| | | | |
|---|---|---|---|
| 6,145,480 A | 11/2000 | Betz et al. | |
| 6,367,258 B1 | 4/2002 | Wen et al. | |
| 7,870,849 B2 * | 1/2011 | Ceratto | F02D 41/0027 |
| | | | 123/527 |
| 9,091,240 B2 * | 7/2015 | Grant | F02M 69/00 |
| 2008/0029072 A1 * | 2/2008 | Ceratto | F02D 41/0027 |
| | | | 123/527 |
| 2010/0192890 A1 * | 8/2010 | Brooks | F02B 29/0412 |
| | | | 123/1 A |
| 2012/0186560 A1 | 7/2012 | Lund | |
| 2014/0076291 A1 | 3/2014 | Wong | |
| 2014/0130522 A1 * | 5/2014 | Steffen | F17C 9/02 |
| | | | 62/48.1 |
| 2014/0174709 A1 * | 6/2014 | Fiveland | F02B 29/0412 |
| | | | 165/222 |
| 2014/0202429 A1 * | 7/2014 | Grant | F02M 69/00 |
| | | | 123/445 |
| 2015/0083055 A1 * | 3/2015 | Melanson | F02M 21/02 |
| | | | 123/2 |
| 2016/0040609 A1 | 2/2016 | Flohr et al. | |
| 2016/0090873 A1 * | 3/2016 | Weissenmayer | F01N 5/02 |
| | | | 60/618 |
| 2016/0108857 A1 * | 4/2016 | Kanafani | F02M 21/06 |
| | | | 123/294 |
| 2016/0138510 A1 * | 5/2016 | Bouvier | F02M 21/0212 |
| | | | 123/250 |

FOREIGN PATENT DOCUMENTS

| | | |
|---|---|---|
| KR | 2015-0058974 | 5/2015 |
| WO | WO 2013/047574 A1 | 4/2013 |
| WO | WO 2015/054657 A1 | 4/2015 |

* cited by examiner

FIG. 7

# SYSTEM, METHOD, AND APPARATUS TO CONTROL ENGINE INTAKE MANIFOLD AIR TEMPERATURE

TECHNICAL FIELD

The present disclosure relates to dual fuel engines and, more particularly, to a system, an apparatus, and a method for controlling engine intake manifold air temperature (IMAT) in a dual fuel engine based on detection of operating characteristics associated with the dual fuel engine.

BACKGROUND

A dual fuel engine is designed to run on more than one fuel, for example, a liquefied gas-diesel mixture. In such engines, a relatively small quantity of injected liquid diesel fuel is compression ignited, which, in turn, ignites a relatively larger charge of natural gas. In a dual fuel compression ignition engine, the ratio of substituted natural gas may be limited by abnormal combustion conditions, such as abnormal detonation (i.e., engine knock), which is generally dependent on intake manifold air temperature (IMAT), among various other boundary conditions, such as cylinder temperature, gas-diesel mixture temperature, cylinder compression, etc. The dual fuel compression ignition engine, using diesel and natural gas, can be sensitive to IMAT, which may limit the amount of natural gas available for combustion.

International Publication No. WO 2013/047574, hereafter the '574 publication, describes a direct-injection diesel engine system that uses a high-pressure gas generated by vaporizing a low-temperature liquid fuel as an engine fuel, and that combusts the engine fuel with intake air pressurized by a supercharger. According to the '574 publication, the direct-injection diesel engine system includes a cooling-energy recovery heat exchanger that conducts heat exchange between a heat medium that circulates through a closed circuit and high-pressure low-temperature liquid fuel pressurized by a booster pump to cool the heat medium, and an air-cooling heat exchanger that conducts heat exchange with the heat medium downstream of the cooling-energy recovery heat exchanger to cool air which is to be supplied to the supercharger and used as intake air and/or to cool intake air compressed by the supercharger. However, the '574 publication is not understood to recite selectively providing coolant of a separate circuit aftercooler (SCAC) system to a vaporizer to vaporize low-temperature liquid fuel.

SUMMARY

In one aspect of the present disclosure, a diesel-natural gas combustion engine system configured to operate using natural gas and injected diesel fuel as an ignition fuel is described. The diesel-natural gas combustion engine system comprises a vaporizer including a heat exchanger, where the vaporizer is configured to vaporize liquefied natural gas and provide the vaporized liquid natural gas to the diesel-natural gas combustion engine. The diesel-natural gas combustion engine also includes a jacket water coolant circuit configured to circulate coolant between a cooling jacket of the diesel-natural gas combustion engine and the heat exchanger of the vaporizer to vaporize liquid natural gas in the vaporizer, and a split-flow separate circuit aftercooler circuit configured to circulate coolant between a radiator and an aftercooler to cool post-turbocharger intake manifold air temperature and between the aftercooler and the heat exchanger of the vaporizer to vaporize liquid natural gas in the vaporizer and cool the post-turbocharger intake manifold air temperature. The engine further includes a controller configured to control supply of the natural gas to the diesel-natural gas combustion engine, and determine an abnormal combustion condition of the diesel-natural gas combustion engine. The controller is further configured to, in response to a determination of the abnormal combustion condition of the diesel-natural gas combustion engine, output at least one control signal to change a flow path of the coolant of the split-flow separate circuit aftercooler circuit so as to cause a portion of the coolant of the split-flow separate circuit aftercooler circuit to be directed to the vaporizer to vaporize liquid natural gas in the vaporizer while the natural gas is supplied to the diesel-natural gas combustion engine. The split-flow separate circuit aftercooler circuit includes a plurality of valves that are controllable by the controller to change the flow path of the coolant of the split-flow separate circuit aftercooler circuit such that the portion of the coolant of the split-flow separate circuit aftercooler circuit is directed to the vaporizer, responsive to the at least one control signal output by the controller to change the flow path of the coolant of the split-flow separate circuit aftercooler circuit.

In another aspect of the present disclosure, a system for controlling intake manifold air temperature of a dual fuel engine is described. The system includes a separate circuit aftercooler circuit configured to selectively circulate coolant between a radiator and an aftercooler according to a first flow path and between the aftercooler and a heat exchanger of a vaporizer according to a second flow path. Portions of the first flow path overlap portions of the second flow path. The system further includes a controller configured to receive signals representative of one or more of engine operating conditions, cooling system operating conditions, combustion characteristics, fan operating conditions, and ambient conditions; determine that the intake manifold air temperature needs to be decreased based on the received signals; and control a change of coolant flow in the separate circuit aftercooler circuit from the first flow path to the second flow path responsive to determining that the intake manifold air temperature needs to be decreased. The controller is further configured to control supply of vaporized gas to the dual fuel engine while coolant of the separate circuit aftercooler circuit flows through the second flow path.

In yet another aspect of the present disclosure, a method of actively controlling intake manifold air temperature of a dual fuel engine is described. The method includes steps of determining whether to modify intake manifold air temperature, and modifying the intake manifold air temperature by changing flow of coolant in a cooling circuit having a separate circuit aftercooler from a first flow path to a second flow path responsive to determining that the intake manifold air temperature is to be modified. One of the first flow path and the second flow path includes a heat exchanger of a vaporizer, and portions of the first flow path overlap portions of the second flow path.

Other features and aspects of this disclosure will be apparent from the following description and the accompanying drawings.

BRIEF DESCRIPTION OF THE DRAWINGS

The accompanying drawings, which are incorporated in and constitute a part of the specification, are illustrative of one or more embodiments and, together with the description, explain the embodiments. The accompanying drawings have not necessarily been drawn to scale. Further, any values or dimensions in the accompanying drawings are for illustration purposes only and may or may not represent actual or preferred values or dimensions. Where applicable, some or all select features may not be illustrated to assist in the description and understanding of underlying features.

DETAILED DESCRIPTION

Generally speaking, embodiments of the present disclosure can provide a system, an apparatus, and a method for controlling intake manifold air temperature (IMAT) of an engine, particularly a dual fuel engine such as a diesel-natural gas dual fuel engine. More specifically, embodiments of the present disclosure can control IMAT by selectively diverting coolant from a separate circuit aftercooler (SCAC) system or circuit to vaporize gas, such as liquefied natural gas (LNG), in order to control the temperature of the coolant of the SCAC system and thus the IMAT.

Figure 1:
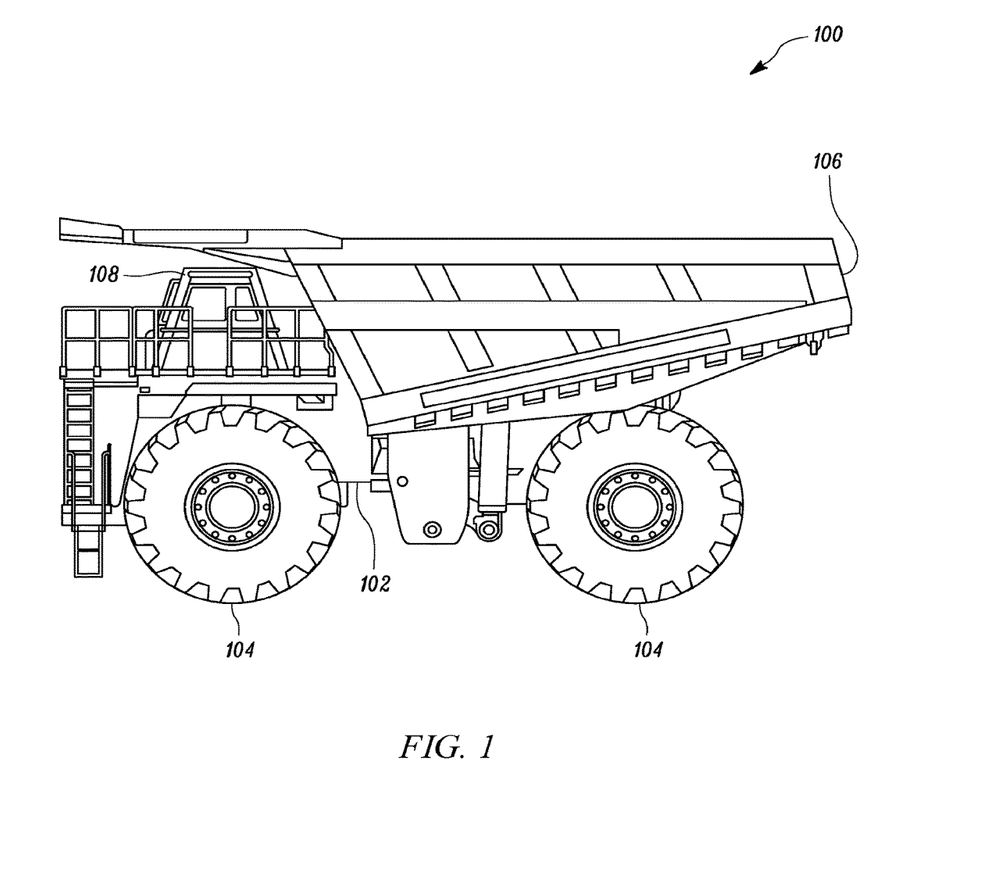
FIG. 1 illustrates a diagrammatic view of a machine, in accordance with one or more embodiments of the present disclosure.

Referring to FIG. 1, a machine, generally referenced by the numeral 100, is illustrated. In the illustrated embodiment, the machine 100 is shown as a mining truck. However, although the machine 100 is shown as a mining truck, the machine 100 may take a variety of other forms including, but not limited to, other trucks (including other mining trucks), a tractor, a loader, a marine vessel, a standalone generator, a pump, etc. In general, the machine 100 in the form of a mining truck can include a frame 102 supported on a conveyance 104. In FIG. 1 the conveyance 104 is shown as wheels; however the conveyance 104 is not limited to wheels. For instance, the conveyance 104 may be tracks or even a propeller in the case of the machine 100 in the form of a marine vessel. The machine 100 in the form of a mining truck may further include a dump body 106 pivotally attached to the frame 102, and an operator station 108.

Figure 2:
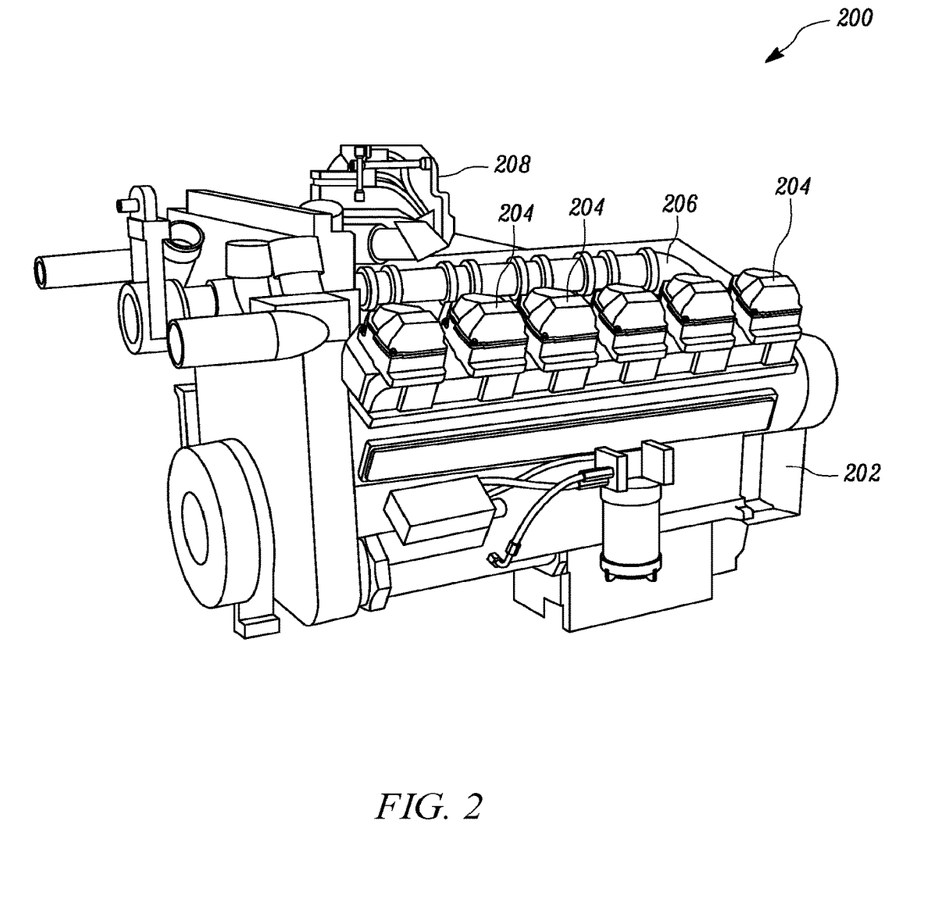
FIG. 2 illustrates a perspective view of an exemplary engine according to one or more embodiments of the present disclosure.

The machine 100 may be powered by an engine, such as engine 200 illustrated in FIG. 2. The engine 200 may be any engine that supplies motive power to the machine 100. In one example, the engine 200 may be supported on the frame 102 and operably coupled to the conveyance 104. For instance, the engine 200 may be mechanically coupled to the conveyance 104, or coupled via an intervening electrical generator that supplies electrical power to motors that directly drive the conveyance 104. In any event, direct and/or indirect coupling between the engine 200 and the conveyance 104 fall within the intended scope of the present disclosure.

In one or more embodiments of the present disclosure, the engine 200 may be a compression-ignition dual fuel engine, such as diesel-natural gas (DNG) combustion engine. Hereinafter, the terms "DNG combustion engine," "compression ignition dual fuel engine," "dual fuel engine," and "engine" may be used interchangeably. Further, a dual fuel engine according to embodiments of the present disclosure may refer to any engine that utilizes two fuels in its combustion space. These two fuels are typically different fuels, but may alternatively be the same fuel at different pressures, for instance. Embodiments of the present disclosure find applicability in gaseous fuel engines that utilize a relatively large charge of natural gas, particularly liquefied natural gas (LNG), which can be vaporized to a gaseous state and provided to a combustion space for combustion via compression ignition of a relatively small charge of diesel fuel. That is, in one or more embodiments, the engine 200 can operate using a pre-mix charge of natural gas and injected diesel fuel or injected diesel fuel and injected natural gas. It should be appreciated, however, that other embodiments in accordance with the present disclosure may operate with different gaseous fuels, such as compressed natural gas (CNG), and, similarly, different main liquid fuels, for example, crude oil, pyoil, or the like. In an exemplary embodiment, engine 200 may be configured to operate using a pre-mixed charge of natural gas and injected diesel fuel as an ignition fuel. Alternatively, in another exemplary embodiment, engine 200 may be configured to operate using injected natural gas and injected diesel fuel as an ignition source.

As illustrated in FIG. 2, the engine 200 may include an engine block 202. The engine block 202 can include a bank of cylinders, collectively referred to as cylinders 204. The cylinders 204 may be made of metallic alloys, such as steel, aluminum-based alloys, etc. The engine 200 may include any number of cylinders 204, and the cylinders 204 may be disposed in an "in-line" configuration, a "V" configuration, a radial configuration, or any other suitable configuration. The engine block 202 may define an intake manifold 206 in fluid communication with the cylinders 204. Further, as generally represented in FIG. 2, the engine 200 may be coupled to or include a turbocharger 208 associated with at least one of the cylinders 204, and an exhaust system (not explicitly shown). In one or more embodiments, the turbocharger 208 may include a turbine 209 and a compressor 210 (e.g., as schematically represented in FIG. 3 and FIG. 4).

Generally, during operation of the engine 200 a mixture of blended fuel and air is provided in at least one of the cylinders 204. Specifically, a fuel injection system (not shown) can inject one or two fuels into the at least one cylinder 204, and air, for example charged air, can be introduced into the at least one cylinder 204 via the intake manifold 206. After combustion, exhaust gas generated by the combustion process can be released from the at least one cylinder 204 via the exhaust system, for instance, an exhaust system connected to the turbocharger 208. The turbocharger 208 can use the heat and pressure of the exhaust gas to drive the compressor 210 to compress intake air prior to being supplied to the cylinders 204. Specifically, the exhaust gas can pass through the turbine 209 of the turbocharger 208 so as to rotate the turbine 209, which can cause the exhaust gas to decrease in pressure and temperature. The compressor 210 may be rotatably connected to the turbine 209 via a common shaft and configured to be driven by the turbine 209 to compress air intake by the engine 200.

In an engine system associated with the engine 200, the LNG fuel can be maintained in a liquid state in a cryogenic fuel tank 212. The LNG fuel can be maintained in the cryogenic fuel tank 212 using cryogenic techniques, for instance. A cryogenic pump (not shown) may be provided to pump the LNG fuel from the cryogenic fuel tank 212 to the at least one cylinder 204 of the engine 200. Alternatively, the pressure in the cryogenic fuel tank 212 may be adequate enough to supply the LNG fuel without a pump to the at least one cylinder 204 of the engine 200. Further, the engine system associated with the engine 200 may include a liquid fuel tank 214 to store liquid fuel, such as diesel fuel, to provide to the engine as a primary or ignition fuel source. The engine system associated with the engine 200 may also include or be in fluid communication with a vaporizer 216. The vaporizer 216 can vaporize the LNG provided from the cryogenic fuel tank 212 via an LNG supply line 213, and the vaporized LNG can be provided to the at least one cylinder 204 of the engine 200. That is, the vaporizer 216, which can include a heat exchanger 218, can provide vaporized LNG to the engine 200. Generally speaking, the heat exchanger 218 can facilitate the transfer of heat from one or more engine coolant systems or circuits based on the cooling process that occurs when the LNG is vaporized.

Figure 3:
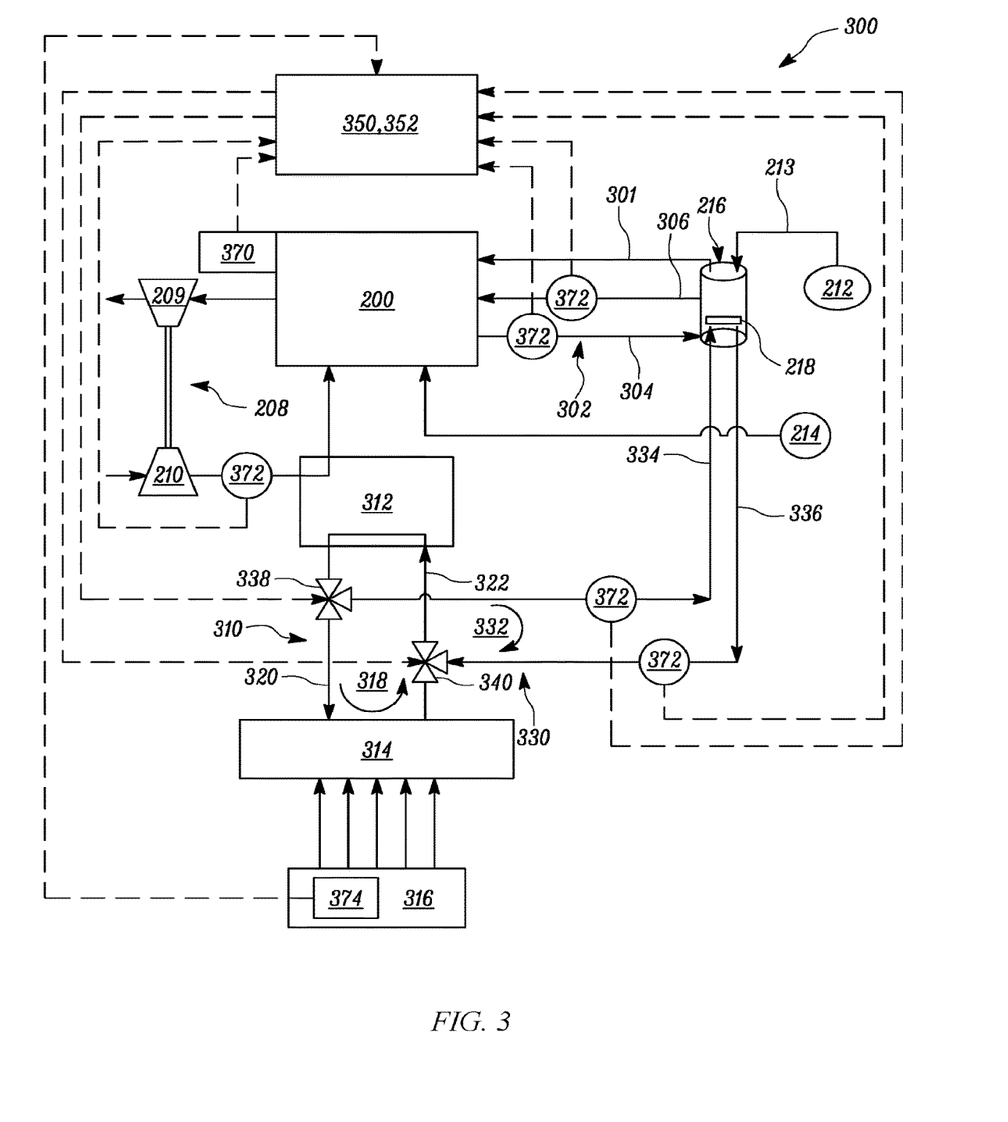
FIG. 3 illustrates a schematic diagram of a system to control intake manifold air temperature of the engine of FIG. 2, in accordance with an embodiment of the present disclosure.
Figure 4:
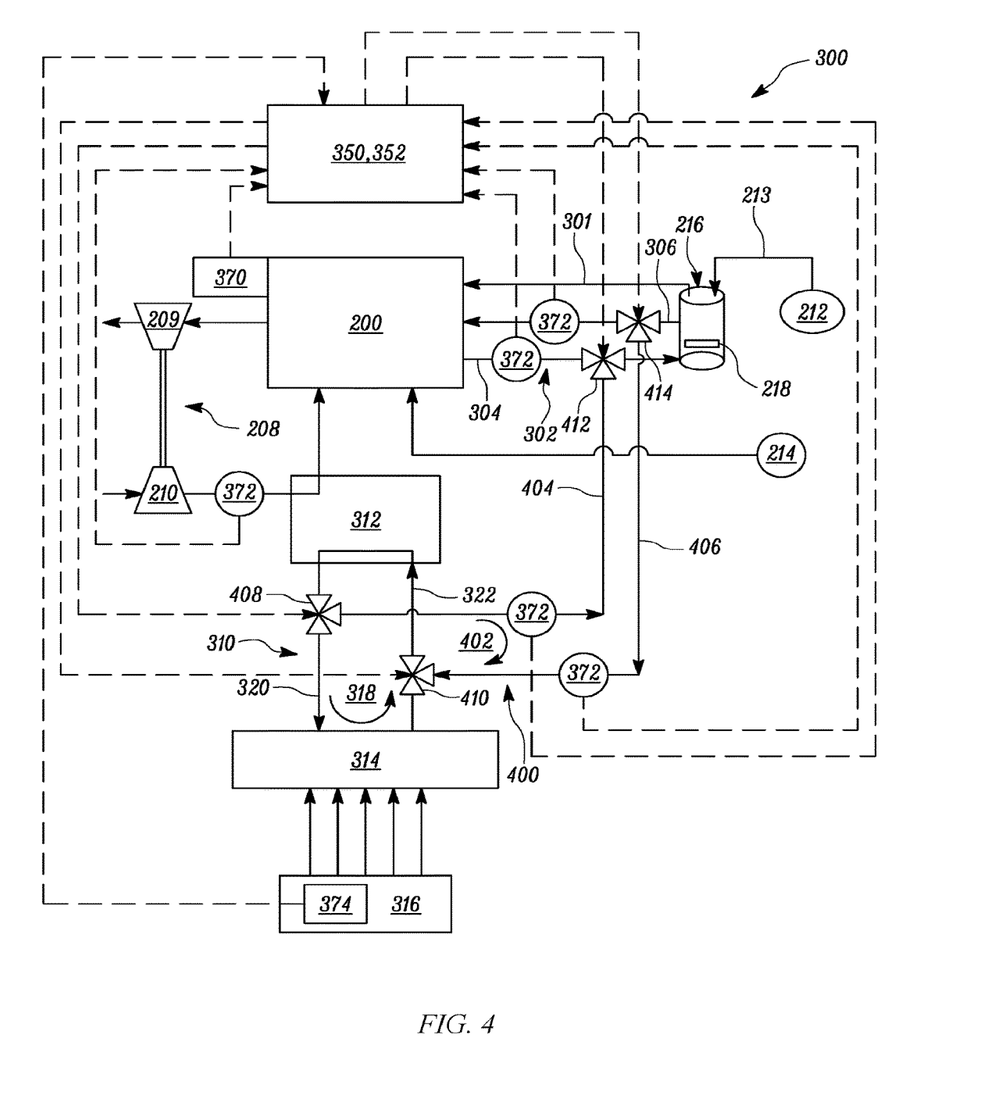
FIG. 4 illustrates a schematic diagram of a system to control intake manifold air temperature of the engine of FIG. 2, in accordance with another embodiment of the present disclosure.

FIGS. 3-4 illustrate schematic diagrams of different embodiments of a system 300 to control intake manifold air temperature (IMAT) of an engine, such as engine 200, in accordance with the present disclosure.

As shown in FIGS. 3-4, a fuel line 301 can connect the vaporizer 216 to the engine 200. The fuel line 301 can supply vaporized fuel from the vaporizer 216, such as vaporized LNG, to the engine 200. The system 300 may include a jacket water coolant circuit 302. Generally speaking, the jacket water coolant circuit 302 can circulate coolant between a cooling jacket (not shown) of the engine 200 and the heat exchanger 218 of the vaporizer 216. Coolant flowing through the jacket water coolant circuit 302 can be cooled by the heat exchanger 218 by transfer of heat or thermal energy from the coolant to the LNG fuel during vaporization of the LNG fuel in the vaporizer 216. That is, the coolant coming from the engine 200 by way of the jacket water coolant circuit 302 is generally at a higher temperature in comparison to the LNG fuel in the vaporizer 216. In the heat exchanger 218, the coolant heats the LNG fuel, thereby vaporizing the LNG fuel, while the coolant, in turn, gets cooled in the process due to the transfer of heat or thermal energy from the coolant to the LNG.

The jacket water coolant circuit 302 can include a "hot" coolant line 304 and a "cold" coolant line 306 that may form a closed loop cooling circuit arrangement with the heat exchanger 218 of the vaporizer 216. The hot coolant line 304 can supply hot coolant from the engine 200 to the heat exchanger 218 for cooling, and the cold coolant line 306 can take the cooled coolant from the heat exchanger 218 back to the engine 200 to cool the engine. The jacket water coolant circuit 302 may also include a pump or the like (not shown) to maintain circulation of the coolant therein. In one or more embodiments of the disclosed subject matter, the coolant of the jacket water coolant circuit 302 may be water, glycol or a combination thereof.

Further, as depicted in FIGS. 3-4, the system 300 can include a split-flow separate circuit aftercooler (SCAC) circuit 310. The SCAC circuit 310 can include an aftercooler 312 and a radiator 314. It may be understood that aftercooler 312 may be interpreted as a heat exchanger.

The aftercooler 312 may be disposed in fluid communication with the turbocharger 208, particularly an output of the compressor 210 of the turbocharger 208, to receive compressed intake air therefrom. Further, the SCAC circuit 310 can circulate coolant between the aftercooler 312 and the radiator 314 to cool the intake air at the aftercooler 312 for supply to the engine 200, or, in other words lower post-turbocharger intake manifold air temperature (IMAT). Optionally, the same coolant may be used for both coolant circuits, i.e., the SCAC circuit 310 and the jacket water coolant circuit 302. Alternatively, one or more of the coolant circuits may use 50/50 water-glycol, pure glycol, or pure water, and the other may use another of the foregoing. In one or more embodiments, the SCAC circuit 310 may also include a fan 316 disposed in association with the radiator 314 and configured to provide a draft of air, for instance, ambient air, for the radiator 314 to cool the coolant of the SCAC circuit 310. The SCAC circuit 310 can form a first flow path 318 (represented as directional arrow to signify the path taken by the coolant) to circulate coolant between the aftercooler 312 and the radiator 314, and can be formed of a SCAC coolant return line 320 to supply hot coolant from the aftercooler 312 to the radiator 314, and a SCAC coolant supply line 322 to recirculate the coolant (relatively cold) from the radiator 314 back to the aftercooler 312.

In accordance with embodiments of the present disclosure, the system 300 can selectively circulate coolant between the aftercooler 312 and the heat exchanger 218 of the vaporizer 216 via a second flow path (e.g., flow path 332 or flow path 402 discussed below). Such routing of coolant from the first flow path 318 to the heat exchanger of the vaporizer 216 can facilitate and/or expedite cooling of coolant received from the aftercooler 312. Such coolant cooled by the heat exchanger 218 of the vaporizer may then be returned to the aftercooler 312, in the SCAC circuit 310, to cool engine intake air and thus lower the IMAT. For this purpose, the system 300 according to embodiments of the present disclosure can include a cooling circuit (different from the coolant circuit 302).

As noted above, embodiments of the present disclosure can embody at least two different configurations for the cooling circuit, for instance, a cooling circuit 330 (as illustrated in FIG. 3), and a cooling circuit 400 (as illustrated in FIG. 4), each of which is discussed in more detail below.

In the embodiment illustrated in FIG. 3, the coolant circuit 330 can provide selective coolant communication directly between the SCAC circuit 310 and the heat exchanger 218. That is, coolant circuit 330 can provide the second flow path 332 (represented as a directional arrow to signify the path taken by the coolant) comprised of at least an inter-circuit supply line 334 and an inter-circuit return line 336. Optionally, portions of the SCAC circuit 310 may also be considered part of the second flow path 332, such as respective portions of the SCAC coolant return line 320 and the SCAC coolant supply line 322. A first end of the inter-circuit supply line 334 can be connected to the SCAC coolant return line 320 to receive relatively hot coolant from the aftercooler 312, and a second end of the inter-circuit supply line 334 can be connected to the heat exchanger 218. Further, a first end of the inter-circuit return line 336 can be connected to the heat exchanger 218 to receive cooled coolant, after vaporization of the LNG fuel, and a second end of the inter-circuit return line 336 can be connected to the SCAC coolant supply line 322 to supply the coolant (cooled by the heat exchanger 218) back to the aftercooler 312. The coolant circuit 330 can also include valves, such as a first valve 338 (e.g., a 3-way valve) disposed at a junction of the SCAC coolant return line 320 and the inter-circuit supply line 334, and a second valve 340 (e.g., a 3-way valve) disposed at a junction of the SCAC coolant supply line 322 and the inter-circuit return line 336.

Generally, cooling circuit 330 can provide for the selective control of coolant flow between the first flow path 318 and the second flow path 332. Further, while the first flow path 318 may not involve coolant flow via the inter-circuit supply line 334, the heat exchanger 218, and the inter-circuit return line 336, when coolant is flowing through the second flow path 332, coolant may also be flowing via the first flow path 318. Thus, a portion or portions of the first flow path 318 may overlap a portion or portions of the second flow path 332.

In the embodiment illustrated in FIG. 4, the coolant circuit 400 can provide selective coolant communication between the SCAC circuit 310 and the heat exchanger 218 by way of a portion of the jacket water coolant circuit 302. That is, the coolant circuit 400 can provide a second flow path 402 comprised of at least an inter-circuit supply line 404 and an inter-circuit return line 406. Optionally, portions of the SCAC circuit 310 may also be considered part of the second flow path 402, such as corresponding portions of the SCAC coolant return line 320 and the SCAC coolant supply line 322. Likewise, portions of the jacket water coolant circuit 302 may additional or alternatively be considered part of the second flow path 402, such as corresponding portions of an inter-circuit supply line 404 and an inter-circuit return line 406.

A first end of the inter-circuit supply line 404 can be connected to the SCAC coolant return line 320 to receive relatively hot coolant from the aftercooler 312, and a second end of the inter-circuit supply line 404 can be connected to the hot coolant line 304. Further, a first end of the inter-circuit return line 406 can be connected to the cold coolant line 306 to receive cooled coolant, after vaporization of the LNG fuel, and a second end of the inter-circuit return line 406 can be connected to the SCAC coolant supply line 322 to supply the coolant (cooled by the heat exchanger 218) back to the aftercooler 312. The coolant circuit 400 can also include valves, such as a first three-way valve 408 disposed at a junction of the SCAC coolant return line 320 and the inter-circuit supply line 404, a second three-way valve 410 disposed at a junction of the SCAC coolant supply line 322 and the inter-circuit return line 406, a third three-way valve 412 disposed at a junction of the hot coolant line 304 and the inter-circuit supply line 404, and a fourth three-way valve 414 disposed at a junction of the cold coolant line 306 and the inter-circuit return line 406.

Generally speaking, cooling circuit 400 can provided for the selective control of coolant flow between the first flow path 318 and the second flow path 402. Further, while the first flow path 318 may not involve coolant flow via the inter-circuit supply line 404, a portion of the hot coolant line 304, the heat exchanger 218, a portion of the cold coolant line 306, and the inter-circuit return line, when coolant is flowing through the second flow path 402, coolant may also be flowing via the first flow path 318. Thus, a portion or portions of the first flow path 318 may overlap a portion or portions of the second flow path 402.

Referring to FIGS. 3-4, the system 300 can further include an engine control module (ECM) 350 configured to control operations of components of the engine 200 or associated with the engine 200. The ECM 350 may include a controller 352 configured to control operation of the various components of the system 300. Further, optionally, the controller 352 may be interpreted as being comprised of components outside and/or connected to the ECM 350, such as electrical/electronic circuitry, signal lines, sensors, etc. Additionally, the controller 352 may be configured integrally with the ECM 350, or alternatively, may be configured separately, but in communication with the ECM 350.

Figure 5:
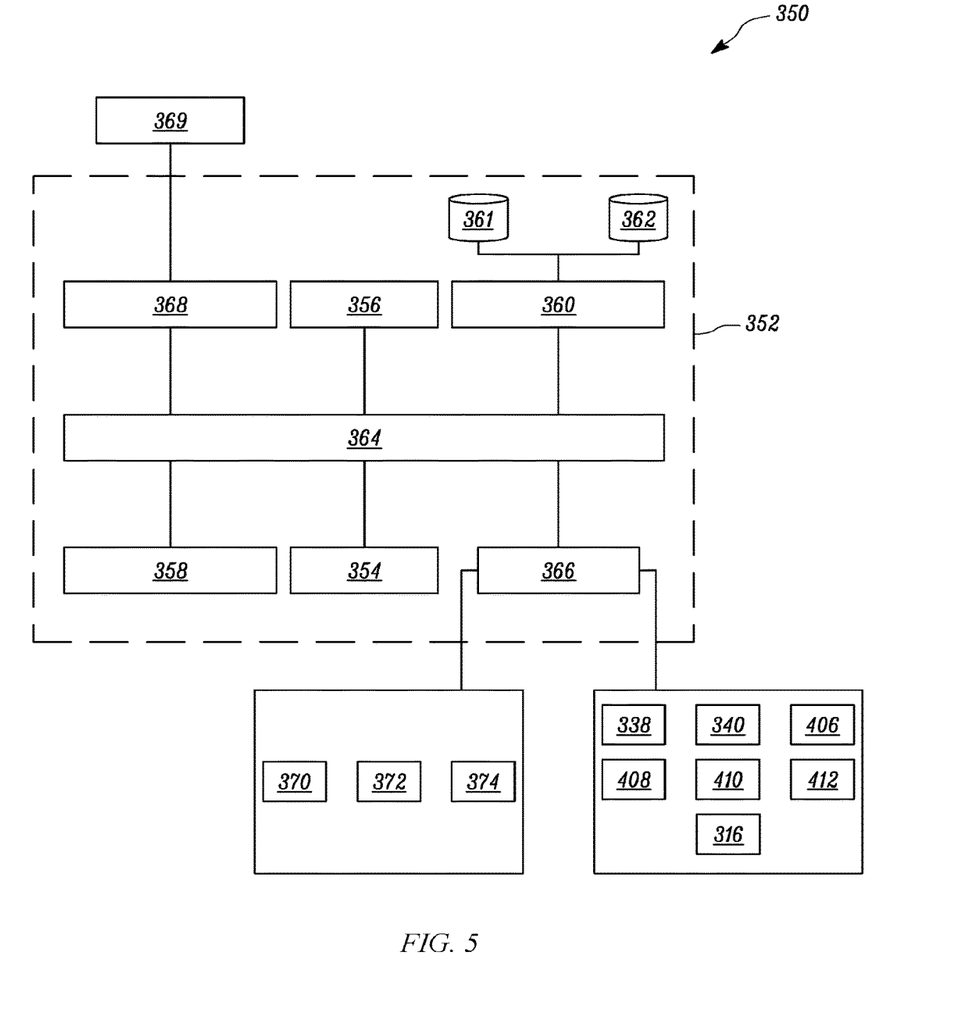
FIG. 5 illustrates a schematic block diagram of a controller configured to control intake manifold air temperature of the engine of FIG. 2, in accordance with one or more embodiments of the present disclosure.

FIG. 5 illustrates a schematic block diagram of the ECM 350 showing the controller 352 in communication with components of the machine 100, such as the engine 200. The controller 352 may include a processor 354, memory 356, and a network interface 358. The controller 352 may also include circuitry components such as a bus 364 to provide communication and control data between components of the controller 352. The controller 352 may further include an input/output interface 366 that facilitates communication with various components of the engine 200, such as sensors and actuators, as will be discussed later. In one or more embodiments, the controller 352 may be a single controller, such as a machine main control unit connected to all sensors and actuators of the engine 200, or, generally, the machine 100. In one or more embodiments, the controller 352 may also include a display controller 368 configured to output engine-related data to a monitor 369 of the ECM 350, for instance, a master controller of the machine 100. The controller 352 may control operation by executing operating instructions, such as, computer readable program code stored in the memory 356. The operations may be initiated automatically or based on an external input. Various other components may be associated with the controller 352 including, but not limited to, a power supply module or modules, a signal processing module or modules, etc.

According to an embodiment of the present disclosure, the controller 352 can cause or direct the natural gas to be supplied to the engine 200. The controller 352 can also detect an abnormal combustion condition of the engine 200, and in response to detection of the abnormal combustion condition of the engine 200, change a flow path of coolant of the SCAC circuit 310 so as to cause a portion of the coolant of the SCAC circuit 310 to be directed to the vaporizer 216, particularly the heat exchanger 218. At the same time, the natural gas can be supplied to the engine 200.

Optionally, the controller 352 can modulate the change in the flow path of the coolant of the SCAC circuit 310 between a first flow path where coolant from the SCAC circuit 310 is not provided to the heat exchanger 218 of the vaporizer 216 and a second flow path where coolant from the SCAC circuit 310 is provided to the heat exchanger 218 of the vaporizer depending upon whether the abnormal combustion condition of the engine 200 is detected. Additionally or alternatively, the controller 352 can cause or direct coolant of the SCAC circuit 310 to flow according to the second flow path in situations where intake manifold temperature is uncontrolled or based on other factors, such as detection of a relatively high ambient temperature (e.g., temperature outside the machine 100), a relatively high under-hood temperature, when air is recirculated around the engine, altitude, low boost, or any other condition that may lower charge density.

The controller 352 may be configured to detect the abnormal combustion condition of the engine 200 (and/or one or more other conditions that may lower charge density) based on signals from one or more sensors in communication therewith. For example, as illustrated in FIGS. 3-4, the system 300 may include a sensor 370 (or sensors) associated with the cylinders 204 of the engine 200. The sensor 370 may be an in-cylinder pressure or knock sensor, for instance. Generally speaking, the sensor 370 can detect detonation in the engine 200, where such signal may be analyzed by the ECM 350 to determine whether the detonation is abnormal. In some examples, the system 300 may further include one or more temperature sensors 372 associated with coolant and/or airflow lines of the system 300 and in communication with the controller 352 of the ECM 350. For example, as illustrated in FIGS. 3-4, the system 300 may include temperature sensors 372 configured to sense coolant temperature of the hot coolant line 304, the cold coolant line 306, the inter-circuit supply line 404 and the inter-circuit return line 406. The system 300 may also include a temperature sensor 372 configured to sense air temperature of the line supplying the intake air from the turbocharger 208 to the intake manifold 206. Optionally, the temperature sensor 372 is inside the intake manifold 206 and configured to measure the IMAT. In one or more embodiments, the system 300 may also include a speed sensor 374, associated with the fan 316, to measure speed of the fan 316, which may be representative or indicative of the cooling capacity of the radiator 314.

In one or more embodiments, the controller 352 may be configured to receive signals representative of one or more of engine operating conditions, cooling system operating conditions, combustion characteristics, fan operating conditions, and ambient conditions from respective sensors as discussed above. For example detection of abnormal combustion may be achieved using either a feedback or a feedforward process (e.g., sensed ambient temperature versus data mapped in a lookup table). Feedback processing may use data from the sensor 370 to determine abnormal conditions of the engine 200. Feedforward processing may use a lookup table based on the engine speed, temperature data, etc.

Further, the controller 352 can determine whether the IMAT needs to be modified, for example decreased, based on the received signals. Such determination can be based on the received signals, and particularly to cool the IMAT, when the received signals represent one of an abnormal combustion condition of the engine 200 or characteristics identified as likely to lead to the abnormal combustion condition, for instance. In this regard, it is worth noting that a cause of abnormal engine combustion of the engine 200 may be the increase in the IMAT. Therefore, in response to detection of abnormal combustion or engine-related conditions likely to lead to abnormal combustion, a portion of the coolant of the SCAC circuit 310 may be directed to the vaporizer 216, thereby reducing the temperature of the coolant of the SCAC circuit 310 based on the vaporization process, and ultimately reducing the intake manifold air temperature (IMAT). Of course, detection of an abnormal combustion condition is not the only condition in which the ECM 350 can redirect a portion of coolant of SCAC circuit 310 to the heat exchanger 218 of the vaporizer 216. For example, such coolant control can be responsive to detection of an operating condition that lowers or may lower charge density of turbocharger 208.

In one or more embodiments, the controller 352 may be configured to change coolant flow of the SCAC circuit 310 from the first flow path 318 to the second flow path 332, 402 when it is determined that the IMAT needs to be decreased. To change the flow path of coolant, the controller 352 can provide a signal to configure corresponding valves, such as valves 338, 340, 408, 410, 412, 414, to change the flow path of the coolant of the SCAC circuit 310 such that a portion of the coolant of the SCAC circuit 310 is directed to the vaporizer 216. For example, valve 338 and valve 340 of FIG. 3 may be operated such that a first portion of coolant of the SCAC circuit 310 still flows to the radiator 314 and such that a second portion of the SCAC circuit 310 is caused to flow to and from the heat exchanger 218 via inter-circuit supply line 334 and inter-circuit return line 336, respectively.

As another example, similar to FIG. 3, in FIG. 4 valve 338 and valve 340 of FIG. 3 may be operated such that a first portion of coolant of the SCAC circuit 310 still flows to the radiator 314 and such that a second portion of coolant of the SCAC circuit 310 is caused to flow to and from the heat exchanger 218, this time, however, via inter-circuit supply line 404 and inter-circuit return line 406, respectively. Notably, in the example of FIG. 4, valve 412 and valve 414 can be operated such that coolant from the SCAC circuit 310 passes from the inter-circuit supply line 404 to a portion of the hot coolant line 304, then to the heat exchanger 218, then to a portion of the cold coolant line 306, before reaching the inter-circuit return line 406. Further, no coolant may be circulated to the engine jacket of the jacket water coolant circuit 302.

Thus, in one or more embodiments of the disclosed subject matter, the SCAC circuit 310 can selectively circulate coolant between the aftercooler 312 and the radiator 314 according to the first flow path 318, and between the aftercooler 312 and the heat exchanger 218 of the vaporizer 216 according to the second flow path 332, 402. Further, portions of the first flow path 318 can overlap portions of the second flow path 332, 402. It may be understood that coolant supplied to the SCAC circuit 310 by way of the second flow path 332, 402, generally speaking, can be cooler than coolant supplied to the SCAC circuit 310 by way of only the first flow path 318. It may also be understood that the portion of the coolant of the SCAC circuit 310 directed to the vaporizer 216 can be interpreted as a first portion of the coolant of the SCAC circuit 310, and a second portion of the coolant of the SCAC circuit 310 can still being directed to the radiator 314. In or more embodiments, the controller 352 can stop flow of coolant in a portion of the jacket water coolant circuit 302 upon changing of the flow path of the coolant of the SCAC circuit 310, from the first flow path 318 to the second flow path 332, 402. In another example, the controller 352 can continue flow of coolant of the jacket water coolant circuit 302 upon changing of the flow path of the coolant of the SCAC circuit 310 to the second flow path 332, 402. Optionally, the change in the flow path of the coolant includes modulating the flow path between the "changed" flow path to a flow path prior to the change. In the system 300, as illustrated in FIG. 4, for instance, the changed flow path of the coolant of the SCAC circuit 310 can include a portion of a flow path of the jacket water coolant circuit 302.

Regarding the cooling circuit 330 of FIG. 3, both the coolant from the jacket water coolant circuit 302 and coolant of the SCAC circuit 310 may be provided to the heat exchanger 218 of the vaporizer 216 to vaporize the LNG (as there can be enough coolant capacity of the LNG to cool both during the vaporization process). In such cases, the first valve 338 and the second valve 340 may either completely stop the flow of the coolant to the radiator 314, modulate such flow in the SCAC circuit 310 (i.e., "ON/OFF" or "partial flow/full flow"), or merely provide some coolant to the radiator 314 and some coolant to the heat exchanger 218 of the vaporizer 216.

Also, in one or more embodiments, the coolant flow in the jacket water coolant circuit 302 may be modulated. In another embodiment, as per the cooling circuit 400 of FIG. 4, for instance, the coolant flow in the jacket water coolant circuit 302 from the engine 200 to the vaporizer 216 (which is typically how the LNG is vaporized into natural gas) can be stopped using one or both of the third valve 412 and the fourth valve 414. Instead, some or all of the coolant of the SCAC circuit 310 can be diverted to the vaporizer 216, using the first valve 408 and the second valve 410, to vaporize the LNG, thereby reducing the temperature of the coolant of the SCAC circuit 310. This cooled coolant can be recirculated back to the aftercooler 312, in the SCAC circuit 310, to cool the IMAT, for instance, post-turbocharger IMAT. Coolant flowing according to the first flow path and the second flow path may occur while continuing to supply vaporized LNG to the engine 200.

In one or more embodiments of the disclosed subject matter, it may be desirable to reduce IMAT as quickly as possible in order to control or prevent abnormal combustion in the engine 200, for instance. Thus, the controller 352 may initially cause relatively rapid cooling of the coolant in the SCAC circuit 310 by diverting all or substantially all of the coolant of the SCAC circuit 310 to the vaporizer 216. Upon reaching a desired IMAT temperature, the controller 352 may then change from full flow of the coolant from the SCAC circuit 310 to a reduced flow of coolant from the SCAC circuit 310 to the vaporizer 216. For example, the controller 352 may modulate (i.e., "ON/"OFF" or "partial flow/full flow") the flow of coolant to allow the IMAT to gradually decrease. In some cases, the controller 352 may also modulate the coolant flow in the jacket water coolant circuit 302 and the SCAC circuit 310. Allowing a reduced flow of coolant through at least the SCAC circuit 310, for example, via modulating the flow, may avoid an inadvertent or unnecessary step change to outputs of components affected by such flow.

INDUSTRIAL APPLICABILITY

Embodiments of the disclosed subject matter may be implemented in situations involving an engine, such as engine 200, where abnormal engine combustion detected or anticipated, intake manifold air temperature (IMAT) is uncontrolled or other factors, such as high ambient (e.g., outside temperature), high under-hood temperature (when air is recirculated around the engine) altitude, low boost, or any other condition that may lower charge density. For example, when an abnormal combustion condition is detected, the controller 352 may react to reduce the temperature of the coolant in the SCAC circuit 310 by utilizing the cooling capacity of the LNG. This can provide the ability to quickly reduce IMAT, which can prevent the abnormal combustion from occurring. Thus, one or more embodiments of the present disclosure can involve, generally speaking, providing some or all of the coolant of the SCAC circuit 310 to a vaporizer 216 in response to detection of abnormal combustion, or engine-related conditions likely to lead to abnormal combustion, to reduce the temperature of the coolant of the SCAC, which can reduce the IMAT.

Figure 6:
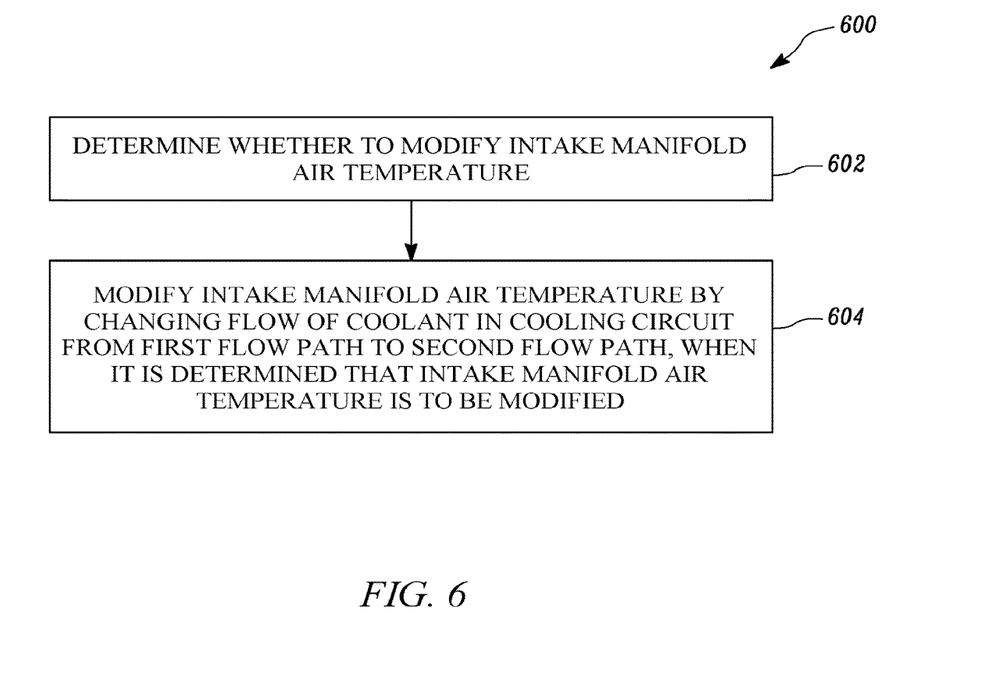
FIG. 6 illustrates a flowchart of a method of controlling intake manifold air temperature of the engine of FIG. 2, in accordance with one or more embodiments of the present disclosure.

Embodiments of the present disclosure also involve a method 600 of actively controlling IMAT of the engine 200, as depicted in the form of a flowchart in FIG. 6.

At step 602, the method 600 can include determining whether to modify the IMAT. Such determination can be based on signals received from various sensors by the ECM 350 pertaining to engine operating parameters and ambient parameters. The determining may determine that the IMAT needs to be lowered, that the IMAT needs to be maintained (e.g., within a temperature range) and/or that the IMAT needs to be increased.

At step 604, the method 600 can include modifying the IMAT by changing flow of coolant in a cooling circuit (e.g., cooling circuits 330, 400) from one flow path to another, such as from the first flow path 318 to the second flow path 332, 402, when it is determined that the IMAT is to be modified. One of the first flow path 318 and the second flow path 332, 402 can include the heat exchanger 218 of the vaporizer 216, and portions of the first flow path 318 can overlap portion of the second flow path 332, 402.

In the method 600, determining that the IMAT is to be modified can be based on detection of the abnormal combustion condition of the engine 200 or characteristics identified to lead to the abnormal combustion condition. As discussed above, modifying the IMAT can include lowering the IMAT. For this purpose, for example, the second flow path 332 can supply a portion of the coolant in the cooling circuit 330, 400 to the heat exchanger 218 of the vaporizer 216 and back to the SCAC circuit 310. Further, modifying the IMAT by changing the flow of coolant in the cooling circuit 330, 400 can include stopping circulation of the coolant between the cooling jacket of the engine 200 and the heat exchanger 218 of the vaporizer 216. Alternatively, modifying the IMAT by changing the flow of the coolant in the cooling circuit 330, 400 can include continuing circulation of the coolant between the cooling jacket and the heat exchanger 218 of the vaporizer 216. The method 600 may also include changing flow of the coolant in the cooling circuit 330, 400 from the second flow path 332, 402 back to the first flow path 318 when the IMAT, as measured by the temperature sensor 372 on the air intake line of the engine 200, for instance, is within a predetermined threshold temperature range.

Figure 7:
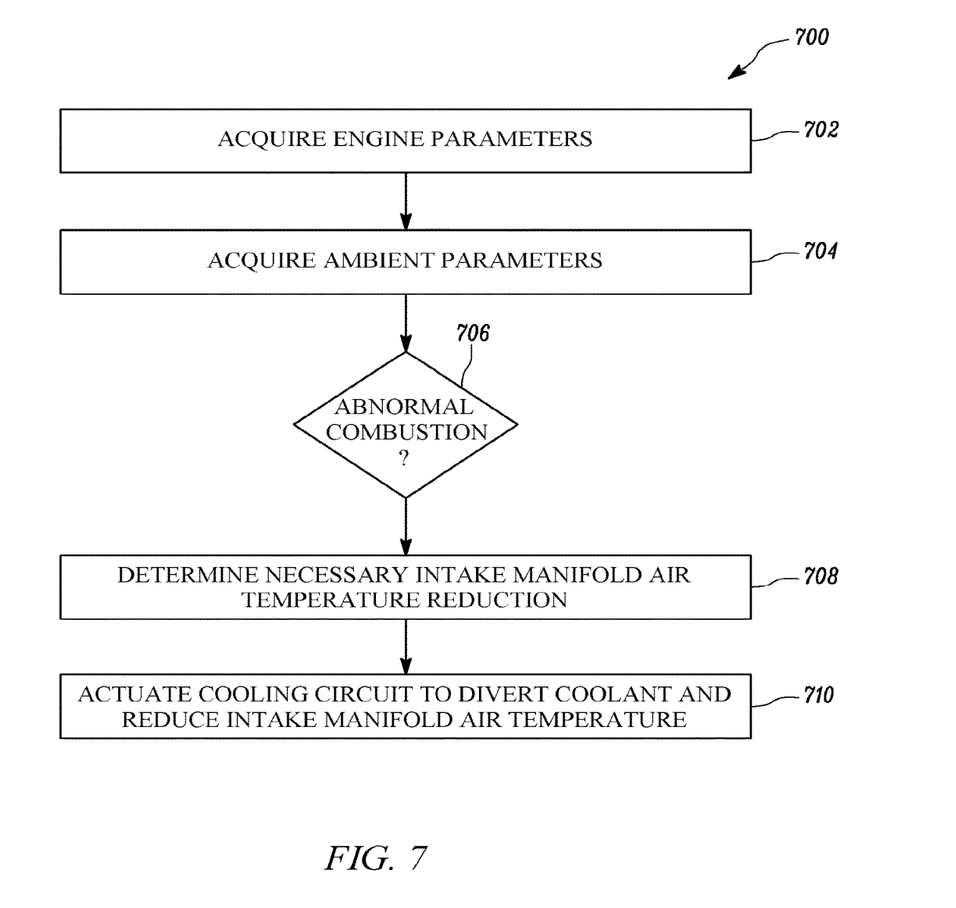
FIG. 7 illustrates a flowchart of a process for preventing abnormal combustion in the engine of FIG. 2, in accordance with one or more embodiments of the present disclosure.

Embodiments of the present disclosure may also involve a process 700 for preventing abnormal combustion in a dual fuel engine as represented by the flowchart illustrated in FIG. 7.

At block 702, the process 700 can include acquiring engine parameters, and at block 704 the process 700 can include acquiring ambient parameters. Engine parameters may include engine speed, engine load, a ratio of substituted gas, combustion pressure, separate circuit after-cooling temperature, pressure, flow rate, fan speed, or the like. Ambient parameters may include external temperatures, humidity levels, oxygen levels, or the like.

At block 706, the process 700 can include determining or detecting an abnormal combustion condition of the engine 200 using the engine parameters and the ambient parameters, and processing such acquired parameters.

At block 708, the process 700 can include determining a necessary IMAT reduction amount, i.e., by how much the IMAT needs to be lowered in order to address (e.g., prevent or minimize) abnormal combustion of the engine. Optionally, the necessary IMAT reduction amount may be determined by comparing the sensed current IMAT with an IMAT that will not or will likely not cause abnormal combustion, as predefined in the memory of the controller 352 or the like.

At block 710, the process 700 can include actuating the cooling circuit 330, 400 to divert the coolant from the SCAC circuit 310 to the heat exchanger 218 of the vaporizer 216 and reduce the IMAT, for instance, by the determined IMAT reduction amount.

Applying non-limiting examples of components to the process 700, the controller 352 can acquire engine parameters and ambient parameters from the sensors 370, 372, 374, deduce from the engine parameters and the ambient parameters an abnormal engine combustion condition, determine from the engine parameters and ambient parameters a necessary intake manifold air temperature reduction amount, actuate actuators of appropriate valves 338, 340, 408, 410, 412, 414 to extract cooling energy from the vaporizer 216 to cool coolant of the SCAC circuit 310, ultimately to reduce the intake manifold air temperature (IMAT).

Detection of abnormal combustion may be implemented by analyzing the engine parameters and the ambient parameters via software instructions performed using the controller 352, for instance. For example, these software instructions may rely on comparing values of the engine parameters and the ambient parameters, e.g., temperature values, or combustion pressure values, with predetermined threshold values, e.g., minimum/maximum in-cylinder temperatures, or minimum/maximum combustion pressure values. The predetermined threshold values may be extracted from databases and/or lookup tables. The necessary IMAT reduction may be determined via software instructions performed using the controller 352, for instance. For example, the software instructions may rely on relationships between the values of the engine parameters and the ambient parameters, and the values of the intake manifold air temperatures. These relationships may be empirical and/or theoretical.

Systems, apparatuses, and methods according to embodiments of the present disclosure can be applicable to dual fuel engines, such as the engine 200, to actively control IMAT, for instance, to provide combustion stability in the event of an abnormal combustion condition situation. Further, the systems, apparatuses, and methods may increase detonation margin and further increase the ratio of gas substituted in a dual fuel mixture. Systems, apparatuses, and methods according to embodiments of the present disclosure can also provide fast and dynamic cooling of the intake manifold air and thus reducing the IMAT as desired, by utilizing available and abundant cooling energy resulting from vaporization of the liquefied natural gas.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A diesel-natural gas combustion engine system configured to operate using natural gas and injected diesel fuel as an ignition fuel, the engine system comprising:
   a vaporizer including a heat exchanger, the vaporizer being configured to vaporize liquefied natural gas and provide the vaporized liquid natural gas to the diesel-natural gas combustion engine;
   a jacket water coolant circuit configured to circulate coolant between a cooling jacket of the diesel-natural gas combustion engine system and the heat exchanger of the vaporizer to vaporize liquefied natural gas in the vaporizer;
   a split-flow separate circuit aftercooler circuit configured to circulate coolant between a radiator and an aftercooler according to a first flow path to cool post-turbocharger intake manifold air temperature and between the aftercooler and the heat exchanger of the vaporizer according to a second flow path to vaporize liquid natural gas in the vaporizer and cool the post-turbocharger intake manifold air temperature; and
   a controller configured to:
   control supply of the natural gas to the diesel-natural gas combustion engine,
   determine an abnormal combustion condition of the diesel-natural gas combustion engine, and
   in response to a determination of the abnormal combustion condition of the diesel-natural gas combustion engine, output at least one control signal to change a flow path of the coolant of the split-flow separate circuit aftercooler circuit so as to cause a portion of the coolant of the split-flow separate circuit aftercooler circuit to be directed to the vaporizer to vaporize liquid natural gas in the vaporizer while the natural gas is supplied to the diesel-natural gas combustion engine,
   wherein the split-flow separate circuit aftercooler circuit includes a plurality of valves that are controllable by the controller to change the flow path of the coolant of the split-flow separate circuit aftercooler circuit such that the portion of the coolant of the split-flow separate circuit aftercooler circuit is directed to the vaporizer, responsive to the at least one control signal output by the controller to change the flow path of the coolant of the split-flow separate circuit aftercooler circuit,
   wherein the change in the flow path of the coolant of the split-flow separate circuit aftercooler circuit is from the first flow path, where no portion of the coolant of the split-flow separate circuit aftercooler circuit is directed to the vaporizer, to the second flow path, where the portion of the coolant of the split-flow separate circuit aftercooler circuit is directed to the vaporizer, and
   wherein the second flow path of the coolant of the split-flow separate circuit aftercooler circuit is in fluid communication with a portion of a flow path of the jacket water coolant circuit.

2. The diesel-natural gas combustion engine system of claim 1, wherein the portion of the coolant of the split-flow separate circuit aftercooler circuit directed to the vaporizer is a first portion of the coolant of the split-flow separate circuit aftercooler circuit, and, concurrently, a second portion of the coolant of the split-flow separate circuit aftercooler circuit is directed to the radiator when the first portion of the coolant of the split-flow separate circuit aftercooler circuit is directed to the vaporizer.

3. The diesel-natural gas combustion engine system of claim 1, wherein the controller is configured to control at least one valve of the plurality of valves to stop flow of the coolant of the jacket water coolant circuit upon the changing of the flow path of the coolant of the split-flow separate circuit aftercooler circuit.

4. The diesel-natural gas combustion engine system of claim 1, wherein the controller is configured to control at least one valve of the plurality of valves to continue flow of the coolant of the jacket water coolant circuit upon the changing of the flow path of the coolant of the split-flow separate circuit aftercooler circuit.

5. The diesel-natural gas combustion engine system of claim 1, wherein the controller is configured control at least one valve of the plurality of valves to modulate the change in the flow path of the coolant of the split-flow separate circuit aftercooler circuit upon the determination of the abnormal combustion condition of the diesel-natural gas combustion engine.

6. The diesel-natural gas combustion engine system of claim 1, wherein the change in the flow path includes modulating the flow path between the change in the flow path and a flow path prior to the change.

7. The diesel-natural gas combustion engine system of claim 1, wherein the controller determines the abnormal combustion condition of the diesel-natural gas combustion engine based on signals from one or more of an in-cylinder pressure sensor and a knock sensor.

8. A system for controlling intake manifold air temperature of a dual fuel engine, the system comprising:
- a separate circuit aftercooler circuit configured to selectively circulate coolant between a radiator and an aftercooler according to a first flow path and between the aftercooler and a heat exchanger of a vaporizer according to a second flow path, portions of the first flow path overlapping portions of the second flow path;
- a coolant circuit configured to circulate coolant between a cooling jacket of the dual fuel engine and the heat exchanger of the vaporizer; and
- a controller configured to:
  - receive signals representative of one or more of engine operating conditions, cooling system operating conditions, combustion characteristics, fan operating conditions, and ambient conditions,
  - determine that the intake manifold air temperature needs to be decreased based on the received signals,
  - control a change of coolant flow in the separate circuit aftercooler circuit from the first flow path to the second flow path responsive to determining that the intake manifold air temperature needs to be decreased, the change in coolant flow being from the first flow path, where no portion of the coolant of the separate circuit aftercooler circuit is directed to the vaporizer, to the second flow path, where some or all of the coolant of the separate circuit aftercooler circuit is directed to the vaporizer; and
  - control supply of vaporized gas to the dual fuel engine while coolant of the separate circuit aftercooler circuit flows through the second flow path;
- wherein the controller is configured to control at least one valve of a plurality of valves to stop circulation of the coolant between the cooling jacket and the heat exchanger of the vaporizer responsive to the control to change the coolant flow of the separate circuit aftercooler circuit from the first flow path to the second flow path.

9. The system of claim 8, wherein the controller is configured to control at least one valve of a plurality of valves to continue circulation of the coolant between the cooling jacket and the heat exchanger of the vaporizer responsive to the control to change the coolant flow of the separate circuit aftercooler circuit from the first flow path to the second flow path.

10. The system of claim 8, wherein the portion of the coolant supplied to the separate circuit aftercooler by way of the second flow path is cooler than the coolant supplied to the separate circuit aftercooler by way of the first flow path.

11. The system of claim 8, wherein the determining that the intake manifold air temperature needs to be decreased is based on a determination that the received signals represent one of an abnormal combustion condition of the dual fuel engine or conditions or characteristics identified to lead to the abnormal combustion condition.

* * * * *